Oct. 7, 1952         O. E. ESVAL         2,613,050
BLIND LANDING INDICATOR AND CONTROLLER FOR AIRCRAFT
Filed Feb. 5, 1947         2 SHEETS—SHEET 1
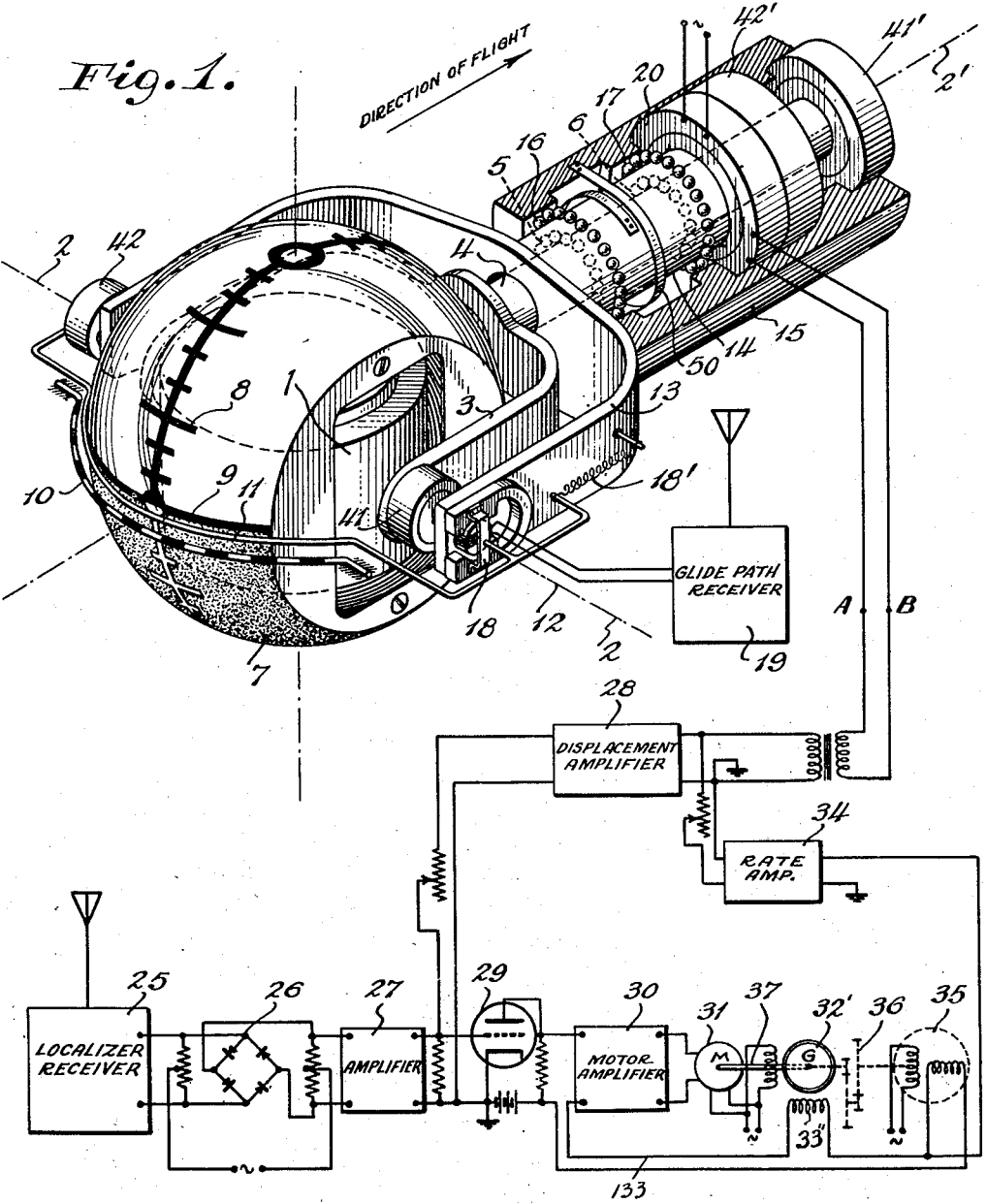
INVENTOR
ORLAND E. ESVAL
BY
Herbert H. Thompson
his ATTORNEY.

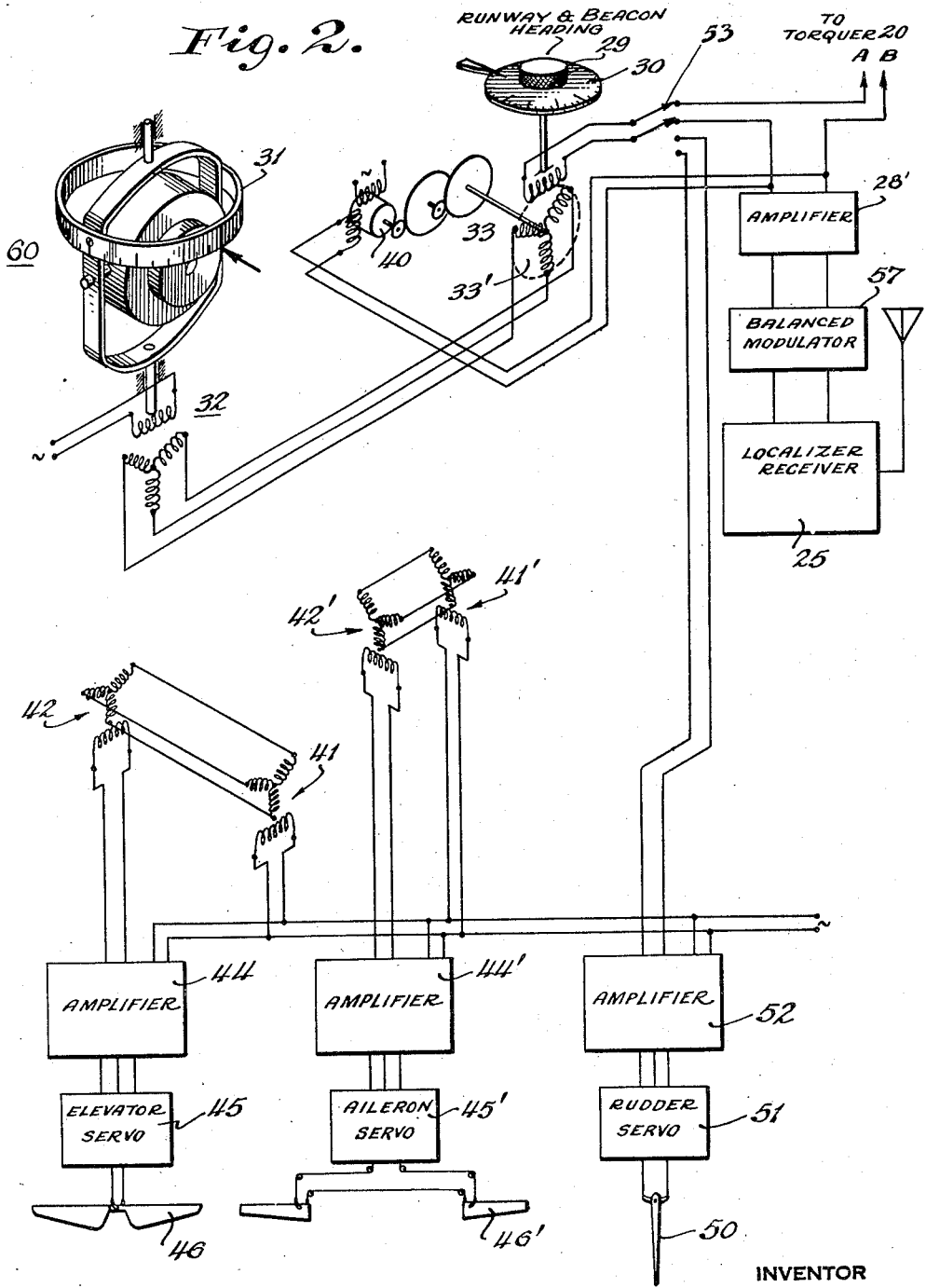

Patented Oct. 7, 1952

2,613,050

UNITED STATES PATENT OFFICE 2,613,050

BLIND LANDING INDICATOR AND CONTROLLER FOR AIRCRAFT

Orland E. Esval, Huntington, N. Y., assignor to The Sperry Corporation, a corporation of Delaware Application February 5, 1947, Serial No. 726,605

18 Claims. (Cl. 244—77)

This invention relates to radio blind landing indicators for aircraft. The present procedure in making a blind landing obliges the aviator to observe not only the conventional cross pointer radio-actuated meter which is responsive to the glide path and localizer radio beams, but also to observe the standard attitude, navigational and airspeed instruments, including the directional gyro and attitude gyroscope, sometimes referred to as the gyro-vertical or artificial horizon. The result is that a blind landing operation has become one of the most difficult flying procedures and is only attempted under blind flying conditions by the most skillful and experienced pilots and is avoided whenever possible.

According to the present invention a unitary instrument is provided for use in blind landing on which is shown clearly how the aviator should fly, either up or down or right or left to maintain the plane on the glide path and localizer beams and at the same time there is shown the true attitude of the plane so that the aviator may at all times know exactly what attitude the plane is in and hence avoid getting into a dangerous attitude in blindly following a radio cross pointer meter.

To accomplish this purpose, I propose that after setting his correct approach airspeed, the aviator, in conducting a blind landing, need observe only a single instrument, such as, an attitude gyroscope or a single face representing an attitude gyroscope and having crossed horizontal and vertical markings on the face of which there is provided an auxiliary bar or index controlled in bank by the localizer beam and in pitch by the glide path beam. According to this instrument when the plane gets above or below the glide path beam, a down or up signal is shown by the aforesaid index on the attitude gyro, causing the aviator to attempt to restore the auxiliary bar to its normal position in line with the equator on the stabilized sphere. Similarly as the plane departs to the right or left of the localizer beam, this bar is tilted or "banked" in a direction and amount such that the aviator in attempting to apparently right the plane puts in a bank in the proper direction and a proper amount to turn the craft back into the localizer beam smoothly and without overshooting.

Preferably the signals fed into the controller of the auxiliary index in bank are a combination of a displacement signal, that is, a signal proportional to the displacement of the craft laterally from the localizer beam, combined with a second signal which is a function of the rate of change of such displacement. By combining these two factors an asymptotic approach to the beam may be achieved.

According to a modification, the second signal fed into my blind landing indicator to cause tilt of the auxiliary bar may be a function of the difference between the runway direction and compass heading of the craft, of which, in the final analysis the rate of change of displacement is a function.

In addition to or in lieu of employing my invention as an attitude indicator and course changer, it likewise is readily adapted to control an automatic pilot for aircraft to guide it along a radio defined course. My invention is also not necessarily limited to being used in blind landing or in radio approaches to landing fields, but may be employed throughout a flight for maintaining the craft on a radio defined course, if desired.

Referring to the drawings showing the several forms of my invention above described, Fig. 1 is a perspective view of my blind landing indicator, showing also a wiring diagram of the input to the same from glide path and localizer beams;

Fig. 2 shows a modified method of obtaining the input to such an indicator from a position maintaining device, Fig. 2 also showing a wiring diagram of an automatic pilot system showing how the same would be controlled from both the attitude gyro of Fig. 1 and the directional gyroscope or gyromagnetic compass during normal flight and from the attitude gyroscope alone (as influenced by the radio glide path and localizer beams) during blind landing operations.

My improved indicator may utilize any known type of gyroscopically stabilized artificial horizon or gyroscope, the type shown being of the form described in the prior patent application of Wrigley, Esval, and Haskins, Serial No. 636,384, filed December 21, 1945, for Attitude Gyros.

According to this system, the sensitive element preferably consists of a rotor (not shown) mounted for spinning about a normally vertically spinning axis within rotor casing 1. The casing is mounted for oscillation about a transverse axis 2 in the gimbal ring 3, which may be U-shaped to afford a full view of the indications from the instrument. Gimbal ring 3, in turn, is mounted for freedom about a fore-and-aft axis 2' by means of long trunnion 4 mounted in spaced bearings 5 and 6. The casing 1 may be formed as, or enclosed within, a hollow truncated sphere 7 on which latitude graduations 8 are placed with a central equatorial marking 9. Preferably the lower half of the sphere is of different color from the upper half. The fixed reference bar 10 extends across the face of the instrument so that pitch is indicated by the up and down movements of the equator or horizon marking 9 and the graduations 8 with respect to the reference 10 and roll by the tilt of the equator or horizon marking 9 with respect to the reference 10.

On such an attitude gyroscope, I provide an additional reference index 11, which may be colored differently from index 10, as for instance, by being made red, while the index 10 is checked black and white. Index 11 normally lies in a horizontal line with the equator 9 and the reference 10, but the position of the index 11 is controlled in pitch from the radio glide path receiver and in roll from the localizer beam. To accomplish this, the index 11 is pivoted independently of the gyroscope. For up and down movement it is pivoted about an axis 12 in a second gimbal 13, the axis 12 normally being in line with the aforesaid axis 2 of the rotor frame. The gimbal 13, in turn, is pivoted in bank by having a long sleeve bearing 14 at the rear journalled in spaced bearings 16, 17 in the fixed support 15 in the instrument case (not shown). A centralizing spring 50 is shown to hold gimbal 13 and its attached index athwartship or normally horizontal.

The pitch of the bar 11 is governed by a motor 18 of the torque or meter type, operating against a centralizing spring 18'. The input to the motor 18, in turn, is controlled from the output of the glide path receiver 19 in a manner resembling the control of the horizontal pointer of the cross pointer meter shown in the prior patent of Percy Halpert, No. 2,502,721, dated April 4, 1950, for Instrument Landing Indicators (see Fig. 2). Likewise the twist or lateral inclination of the bar 11 is controlled from a second torque motor 20 connected to the spring centralized sleeve 14 and controlled generally from the localizer receiver. Since the index 11 is normally centralized when no radio signals are present, it may be used as the sole index for the gyroscope and index 10 omitted. In other words, the bank and pitch of the craft may be controlled by observing the relative tilt and up and down positions of horizon bar 9 and index bar 11.

Preferably there is introduced into the directional controls at least, not only a signal responsive to the departure of the airplane from the beam, but also the rate of departure. In other words, if it is desired to impart to the aviator a signal showing the rate and direction of turn necessary for best results, the rate of turn set in should be proportional to the sum of the displacement from the beam and rate of such displacement away from the beam, or a function of such rate. It is also known that a craft may be caused to turn by banking the craft alone, the rate of turn being a function of the banking angle and airspeed. In my device, therefore, I propose to introduce a tilt or bank into the index 11 proportional to the combination of the displacement from the beam and also the rate of change of such displacement. Since the latter, rate of change of displacement, is also a function of airspeed, the airspeed factor is thus, in large part, automatically taken care of, and also by designing the instrument for the airspeed usually employed in approach landing, the airspeed factor need not enter.

It has been found that when an aircraft is controlled in this manner, that is, making the instantaneous rate of turn proportional to the sum of displacement and rate of displacement signals, the craft is capable of an asymptotic approach to the localizer beacon course. Thus if the pilot keeps the red bar 11 in line with the horizon line 9 on the gyro, he will make an asymptotic approach to the course merely by observing this single instrument and without having to refer to any additional cross pointer meters, directional gyros or turn indicators on the craft. This system has the further advantage that cross winds do not cause an error, since the actual gyro heading is not shown but only the radio course.

For this purpose, I have shown in the wiring diagram the D. C. signal from the localizer receiver 25 applied to a ring modulator 26, which is also supplied with A. C. to give a variable A. C. output which is amplified in amplifier 27 and supplied to the displacement amplifier 28 from which the signal is led to the torque motor 20. The rate of change of such signal is shown as obtained by also supplying the signal from amplifier 27 to a suitable rate taking network. As shown this signal is first applied to the grid of electron tube 29, the output of which controls, through amplifier 30, a motor 31 driving a speed generator 32' giving an A. C. output voltage proportional to its speed and reversible in phase with its direction of rotation. The output of such generator is induced in one of the two-phase windings 33" thereon, and is supplied to the rate amplifier 34 and combined with the output of the displacement amplifier 28 to control the motor 20. A feedback to the input of amplifier 30 is also provided from a transmitter 35 driven preferably at a reduced speed through step-down gearing 36 from the motor generator shaft 37, such transmitter serving to normally oppose the signal from tube 29 and to wipe it out as soon as the angle through which the transmitter is turned becomes sufficient. Hence a speed signal only reaches amplifier 34 while the displacement is changing which is proportional to the rate of displacement change. Tube 29 acts to block any feedback into the displacement signal supplied to amplifier 28. The rate signal of generator 32' may also be fed back as a damping factor to amplifier 30, as shown diagrammatically by lead 133, but it will be understood that in practice separate coils 33" may be used as a feedback and as the rate signal source feeding into rate amplifier 34.

As indicated above, it is desired to govern the craft's heading in such manner that it will be brought onto the beam and kept there by altering the craft's heading in an amount such as to cause it to fly into the region of the radio beam without overshooting.

Fig. 2 represents a second form of the invention in which the displacement signal from the localizer is combined with a signal representing the angular difference in azimuthal positions between the runway beam or beacon and the compass heading of the craft. The greater this angle, the greater the rate of change of displacement should be. As shown in the aforesaid patent of Percy Halpert, this may be accomplished readily by combining the output of the localizer amplifier 28' derived from the output of localizer receiver 25 as in Fig. 1, for instance, with an output proportional to the difference in azimuth angular position or heading between the runway heading (or localizer direction in azimuth), which may be set in by a knob 29 and dial 30 and the craft's heading represented by a compass card 31 on a directional gyroscope or gyro-magnetic compass 60. For this purpose, interconnected Selsyn signal generators 32, 33, one on each of the two devices have their output, representing the difference in magnitude and direction of the heading and runway directions, is combined with the output of the amplifier 28' and led to the motor 20 as before. As is well known in the art, the A. C. output signal supplied by such generators is of a magnitude proportional to the angular error or difference between actual course (heading) and beacon or runway direction.

The device of Fig. 2 as so far described, would have a slight disadvantage as compared to the device of Fig. 1 in case a cross wind were blowing across the landing strip and localizer beam. In such event, the craft would reach a straight course displaced from, but parallel to the desired line of approach, the steady displacement signal being balanced by a steady heading (crabbing) signal. To overcome this difficulty, a correction may be interposed responsive to a persistent displacement signal to slowly readjust in effect, the runway setting dial 30. This may be accomplished by making both parts of the Selsyn signal generator 33 adjustable, one part from the knob 29 and the other part (field 33") from a motor 40 controlled by the output of the amplifier 28' and connected through large ratio reduction gearing to readjust slowly the rotatable field 33' of the Selsyn 33 so as to bring the craft onto the true beam course. Such a mechanism is said to integrate the error or displacement signal with respect to time. This modification is not claimed herein but is claimed in my divisional application Serial No. 293,527, filed June 14, 1952, for Blind Landing Indicator and Controller for Aircraft.

My invention is not only applicable for use as a blind landing indicator, but also as a control instrument for automatic pilots during blind landing. I have represented this arrangement by showing a Selsyn transmitter 41 (Fig. 1) rotated by a relative tilt of the gyro 1 and the gimbal ring 3 and a similar Selsyn transmitter 42 connected between the red index 11 and the gimbal ring 3. These transmitters are cross-connected in the usual fashion as shown in Fig. 2 to give an output proportional to the difference in pitch of the gyro with respect to the gimbal ring 3 and of the bar 11 with respect to said gimbal. In other words, the output is proportional to the pitch angle that the aviator sees in looking at the instrument. This output is fed through an amplifier in the usual manner to the elevator servomotor amplifier 44 controlling servomotor 45 for the elevator 46. Similarly, in roll a transmitter 41' is provided between the trunnion 4 of gimbal 3 and datum, and a second transmitter 42' between the hollow trunnion 14 of gimbal 13 supporting bar 11 and datum, the differential signal from the transmitters actuating the amplifier 44' which controls aileron servomotor 45' governing the ailerons 46'. During normal flight the rudder 50 is shown as operated from the rudder servomotor 51 controlled by amplifier 52 from the signal supplied from the Selsyn transmitter or signal generator 33 when the switch 53 is moved down from the position shown in Fig. 2. At this time, it is understood that receiver 25 would be tuned in on the radio range signal toward which it is desired to fly. When, however, the craft is approaching a blind landing, the control is transferred to the radio localizer beam and the switch 53 is placed in the position shown in Fig. 2 to disconnect entirely the rudder automatic control and to throw the output of the generator 33 over to control the torque motor 20 in combination with the output of the localizer receiver 25 and amplifier 28' as above described, the error signal from transmitter 33 being combined with the signal from displacement amplifier 28' in place of the signals of amplifiers 28 and 34 of Fig. 1.

It will be understood that the transmitters 41, 42 and 41', 42' on the attitude gyro may control the ailerons 45' and elevator 46 at all times, that is, both during normal flight and during blind landing, since during normal flight the red bar 11 is maintained centralized, that is, substantially in line with index 10 on the craft by the centralizing springs 18' and 50.

It will also be understood that my invention is adapted to be used with other types of directional radio than localizer beams. For instance, it might be used with a homing radio automatic pilot designed to "home" on a broadcasting station as disclosed in the prior patent to Bert G. Carlson, No. 2,372,184, dated March 27, 1945, for Homing Automatic Pilots. In this case, the banking torquer 20 would be controlled by the departure of the craft from its radio course or radio line of position as indicated by the direction finder. Similarly my invention may be employed to automatically guide a craft through the automatic pilot along a course or radio line of position indicated by the Loran or omni-directional systems of radio navigation. In all cases, however, it is contemplated that as the landing field is being approached, the indicator or automatic pilot is placed under the control of the localizer and glide path beams.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

This application contains certain features in common with the application of Spencer Kellogg, 2nd, Serial No. 15,064 for Flight Indicating System for Dirigible Craft, filed March 16, 1948, and its continuation-in-part application Serial No. 128,227, filed November 18, 1949, assigned to the same assignee as this application, all of which are issuing concurrently.

What is claimed is:

1. In a radio blind landing indicator for aircraft having a glide path and a localizer receiver, a movable physical index, an attitude gyroscope showing by its position relative to said index both pitch and bank, means for altering the position of said index in pitch from said glide path receiver and means for governing the tilt thereof in bank from said localizer receiver, whereby a change of attitude is indicated when the craft is off its radio course in azimuth or elevation, such as to indicate that the craft should be turned toward its radio course.

2. In a radio guide for aircraft, an index, an attitude gyroscope showing by its position relative to said index the bank of the craft, and means for tilting said index in bank and thereby to cause the pilot to bank the craft to eliminate the apparent bank, and means for controlling said first named means from a directional radio means.

3. A radio guide for aircraft as claimed in claim 2, in which the means for controlling the aforesaid tilting means includes a component responsive to displacement of the craft from the radio defined course and a component responsive to the rate and direction of change of displacement of the craft from said course.

4. A blind landing indicator for aircraft as claimed in claim 2 in which the means for controlling the aforesaid tilting means includes a component responsive to displacement of the craft from the radio beam and a component responsive to magnitude and direction of departure between the localizer or runway heading and the craft's heading.

5. A radio-guided automatic pilot for aircraft having a gyro-stabilizing means adapted to control the craft in elevation and bank, and through bank to control changes in heading, a radio-directional receiver on the craft for modifying such controls upon departure of the craft from a desired radio course, said receiver including a means responsive to displacement of the craft from a desired course in elevation for causing a change in indicated pitch of the craft whereby when apparently correcting the same, the craft is brought on the beam and means responsive to displacement of the craft from the desired radio course in azimuth for indicating a false bank whereby in correcting the same the autopilot changes the heading of the craft to eliminate such displacement.

6. A radio-guided automatic pilot for aircraft having a gyro-stabilizing means adapted to control the craft in azimuth, elevation and bank, and through bank to control changes in heading, a radio-directional receiver on the craft for modifying such controls upon departure of the craft from a desired radio course in elevation for causing a change in pitch attitude to correct such displacement and means responsive to displacement of the craft from a desired course in azimuth for causing a change in bank of the craft to reduce such displacement, and means for modifying the azimuth correction in accordance with the angular difference between the craft's heading and the radio course.

7. A radio-guided automatic pilot for aircraft having a gyro-stabilizing means adapted to control the craft in elevation and bank, and through said bank to control the craft in azimuth, a radio receiver on the craft, and means responsive thereto for altering the bank of the craft for altering its heading whenever the craft is off the radio course until the craft is back on the radio course.

8. In a radio blind landing indicator for aircraft having a glide path and localizer receiver, stationary and movable indices, an attitude gyroscope having a horizon marking thereon showing by its position relative to said indices both pitch and bank, means for altering the position of said movable index in pitch from said glide path receiver, and means for governing the tilt thereof in bank from said localizer receiver, whereby a change of attitude is indicated when the craft is off its radio course in azimuth or elevation, such as to indicate that the craft should be turned toward its radio course.

9. A radio-guided automatic pilot for aircraft as claimed in claim 5, wherein said means for causing change in heading is also responsive to the rate of change of displacement in azimuth toward or away from an indicated radio course.

10. In a homing and blind landing automatic pilot for aircraft, a fixed direction maintaining means producing course signals, attitude maintaining means in elevation and bank producing elevation and bank signals, a radio course receiver producing signals for modifying said other signals, servomotors controlling the elevator, ailerons and rudder, means for controlling the rudder servomotor during normal flight from said course signals, as modified by the signals received from said radio course modifying signals, and means for severing the control of said rudder from said course signals during landing, and means for modifying the bank signals during landing from said radio course signals.

11. A flight indicator for aiding radio guided landing approaches, the combination with a localizer or radio course receiver, and an attitude gyroscope, a pair of attitude indicators which are subject to relative tilting to thereby indicate the bank attitude of the craft, said tilting being in part controlled by said gyroscope, and means controlled from said receiver also for imparting relative tilt thereto in a direction and proportional to the displacement of the craft from the beam or radio course whereby the aviator, in apparently eliminating said tilt, really banks the craft proportionally and in a direction to turn the craft back on to the radio course.

12. In a flight instrument for aiding steering of a craft in azimuth along a radio defined course, the combination with an attitude gyroscope, and means for generating a sense signal when the craft is off the course to the right or left proportional to the amount of off course, means for supplementing said signal by a term varying with the rate of change of said signal, a pair of relatively tiltable attitude indicators, the relative tilt of which indicates the bank attitude of the craft, said tilt being in part controlled by said gyroscope and in part by said supplemented sense signal, whereby the indicator falsely shows bank and the aviator in apparently eliminating the false bank actually banks the craft in a direction and amount to cause it to return asymptotically to the radio course.

13. A radio blind landing indicator for aircraft having a localizer receiver for guiding it in azimuth along a localizer beam, a pair of relatively tiltable attitude indicators, an attitude gyroscope, the relative tilt of said indicators being jointly controlled by the output of said localizer receiver and the position of the gyroscope about the craft's bank axis, whereby a change of bank attitude is shown by the indicators to the observer when the craft is off its radio course in azimuth, such as to indicate that the craft should be banked in a direction to turn it back on to the beam course.

14. A radio blind landing indicator for aircraft having a radio receiver providing a signal upon departure of the craft in azimuth from a radio defined course, an index normally fixed athwartship on the craft, an attitude gyroscope showing the bank of the craft by its stabilized position relative to said index, and means for tilting said index relative to the craft in bank from said signal in a direction to falsely indicate that the craft is banked with the right wing down when the craft is to the right of its radio course and that the craft is banked with its left wing down when the craft is to the left of its radio course.

15. A radio blind landing indicator for aircraft, as claimed in claim 14, further characterized by having means to proportion the amount of tilt imparted to said index to both the displacement and rate of change of displacement of the craft from its radio course.

16. In a radio blind landing indicator for aircraft having a glide path receiver, said indicator including an attitude gyroscope, a horizon indicator actuated thereby, a fixed reference and a movable index both adjacent said horizon indicator, thereby showing the pitch of the craft by the position of said horizon indicator relative to said reference or said index, and means for upwardly displacing said index from said glide path receiver when the craft is below the glide path and for downwardly displacing said index from said glide path receiver when the craft is above the glide path.

17. A flight indicator for aiding radio guided landing approaches, the combination with a localizer or radio course receiver, an attitude gyroscope, a pair of attitude indicators which are subject to relative tilting to thereby indicate the bank attitude of the craft, said tilting being in part controlled by said gyroscope, and means controlled from said receiver also for imparting relative tilt thereto in a direction and proportional to both the displacement of the craft from its radio course and the rate of change of such displacement whereby the aviator, in apparently eliminating said tilt, really banks the craft proportionally and in a direction to bring the craft back onto the radio course asymptotically.

18. A steering aid system for manually piloted dirigible craft including means for providing a signal in accordance with the displacement of the craft from a radio flight path, means for providing a signal in accordance with the first derivative of the displacement, means for coordinating said signals, and means operated by said coordinating means for indicating to the pilot the sense and amount of bank needed to restore the craft to its predetermined flight path.

ORLAND E. ESVAL.

REFERENCES CITED

The following references are of record in the file of this patent:

UNITED STATES PATENTS

| Number | Name | Date |
|---|---|---|
| 1,896,805 | Sperry | Feb. 7, 1933 |
| 2,266,410 | Busignies | Dec. 16, 1941 |
| 2,400,232 | Hall | May 14, 1946 |
| 2,423,337 | Moseley | July 1, 1947 |
| 2,502,721 | Halpert | Apr. 4, 1950 |